US008109342B2

(12) United States Patent
Asao et al.

(10) Patent No.: US 8,109,342 B2
(45) Date of Patent: Feb. 7, 2012

(54) BEACH-CLEANING SYSTEM FOR SEPARATING LITTER FROM SAND, TRAILER INCORPORATING SAME, AND METHOD OF USING SAME

(75) Inventors: Kosuke Asao, Saitama (JP); Jun Nakajima, Saitama (JP); Tatsuo Masuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 12/584,935

(22) Filed: Sep. 15, 2009

(65) Prior Publication Data

US 2010/0071918 A1 Mar. 25, 2010

(30) Foreign Application Priority Data

Sep. 24, 2008 (JP) ................................ 2008-243936

(51) Int. Cl.
*A01D 33/00* (2006.01)

(52) U.S. Cl. .......... 171/143; 171/132; 171/135; 171/14; 171/45; 171/46; 171/112

(58) Field of Classification Search .................... 171/14, 171/15, 43, 45, 46, 111, 112, 132, 135, 142, 171/143, 144
See application file for complete search history.

(56) References Cited

U.S. PATENT DOCUMENTS

| | | | | |
|---|---|---|---|---|
| 491,981 | A * | 2/1893 | Bryant | 171/131 |
| 3,123,552 | A * | 3/1964 | Lowry | 209/326 |
| 6,857,479 | B2 * | 2/2005 | Ohzeki et al. | 171/15 |
| 6,899,185 | B2 * | 5/2005 | Yagisawa et al. | 171/143 |
| 7,798,240 | B2 * | 9/2010 | Arai et al. | 171/143 |
| 2007/0227749 | A1 * | 10/2007 | Arai et al. | 171/111 |
| 2007/0227750 | A1 * | 10/2007 | Ari et al. | 171/111 |
| 2007/0227751 | A1 * | 10/2007 | Arai et al. | 171/111 |

FOREIGN PATENT DOCUMENTS

| | | | |
|---|---|---|---|
| JP | 2007-303087 | | 11/2007 |
| JP | 2010174518 | A * | 8/2010 |
| WO | WO 9515421 | A1 * | 6/1995 |

* cited by examiner

*Primary Examiner* — Robert Pezzuto
*Assistant Examiner* — Jamie L McGowan
(74) *Attorney, Agent, or Firm* — Carrier Blackman & Associates, P.C.; William D. Blackman; Joseph P. Carrier

(57) ABSTRACT

A box-shaped beach-cleaning trailer is configured to be loaded with, and collectively carry beach-cleaning equipment and a litter collection station. The beach-cleaning equipment are towed by a vehicle to collect litter on the sands. The litter collected by the beach-cleaning equipment is collected in the litter collection station. The trailer includes a pair of rail members disposed on upper edges of the respective opposite side wall portions such that the rail members face each other with an opening therebetween. A sieve unit is detachably mounted on the rail members, and is configured to move a back-and-forth direction along the rail members. The sieve unit is moved in a back-and-forth direction manually; or by using a driving mechanism including a drive wheel, a driven wheel, and a connecting rod arranged between the sieve unit and the driven wheel, for separating colleted litter of various sizes from sand.

20 Claims, 8 Drawing Sheets

BEACH-CLEANING SYSTEM FOR SEPARATING LITTER FROM SAND, TRAILER INCORPORATING SAME, AND METHOD OF USING SAME

CROSS-REFERENCE TO RELATED APPLICATIONS

The present invention claims priority under 35 USC 119 based on Japanese patent application No. 2008-243936, filed on Sep. 24, 2008. The entire subject matter of this priority document, including specification claims and drawings thereof, is incorporated by reference herein.

BACKGROUND OF THE INVENTION

1. Field of the Invention

The present invention relates to a beach-cleaning system and method. The system includes a trailer which is loaded with, and which collectively carries a plurality of beach-cleaning apparatus for collecting litter from sandy beach areas, and a collection station in which the litter collected by the beach cleaner is accumulated. More particularly, the present invention relates a system and method for separating litter of various sizes and shapes from sand, and to a trailer incorporating the system.

2. Description of the Background Art

There is a known beach cleaner for collecting various kinds of litter scattered on the sandy beach areas, such as bathing beaches. When towed by a vehicle, during operation thereof, the beach cleaner travels on the sands of the beach to rake the sand and litter together, and collect only the litter by separating the litter from the sand. Further, when towed by the vehicle, the beach cleaner carries the litter collected thereby to a collection station, and operations for moving out the litter form a trailer are performed at the collection station.

The known trailer for beach cleaning is towed by a vehicle. The trailer has an accommodation portion, which is loaded with the beach cleaner and the collection station, and is used to collectively carry them to the beach. The trailer is also used as a part of the collection station (see, for example, the Japanese Patent Application Publication No. 2007-303087).

However, conventionally there has not been a trailer, as the one described above, which is used for collecting litter, and also for separating the collected litter from accompanying sand.

The known beach cleaner and the collection station offer advantages for collecting litter on sandy beach areas where the vehicle can travel. However, such beach-cleaning equipment and collection stations cannot perform the litter collection on areas where the vehicle cannot travel, such as sandy areas with large rocks. On such areas, litter has to be collected through a manual separation of litter from sand.

The present invention has been made in consideration of the above circumstances. Accordingly it is one of the objects of the present invention to provide a beach-cleaning trailer which allows easy collection (and separation) of litter even on areas where the beach cleaner towed by a vehicle cannot be used to collect the litter without collecting sand therewith.

SUMMARY OF THE INVENTION

In order to achieve the above objects, the present invention according to a first aspect thereof provides a beach-cleaning trailer apparatus including equipment for beach cleaning. The trailer is a box-shaped trailer formed by sidewalls, and having an opening on a top portion thereof. The trailer includes wheels arranged at side wall portions thereof. The beach-cleaning trailer is loaded with, and collectively carries, a beach cleaner and a litter collection station. The beach-cleaning equipment are towable by a vehicle so as to collect litter on the sands. The litter collected by the beach-cleaning equipment is accumulated in the litter collection station.

The beach-cleaning trailer includes a pair of rail members disposed on upper edges of the respective side wall portions, respectively, such that they face each other with the opening in between. A sieve unit is detachably mounted on the rail members, and is operable to reciprocally move in a back-and-forth direction along the rail members.

With this structure, for example, sieving can be performed with the sieve unit by placing litter along with sand on the sieve unit using a scoop or the like and reciprocally moving the sieve unit to and fro (in a back-and-forth direction) on the rail members.

The present invention according to a second aspect thereof, in addition to the first aspect, is characterized in that, the beach-cleaning trailer may include a driving mechanism that transmits rotary power of the wheels of the trailer to the sieve unit to move the sieve unit to and fro (in a back-and-forth direction) along the rail members based on the rotary power of the wheels.

With this structure, when the wheels rotate by the trailer traveling, the sieve unit can move to and fro.

Further, the present invention according to a third aspect thereof, in addition to the second aspect, is characterized in that the driving mechanism may be a crank mechanism including a drive wheel arranged on an axle of the wheels, a driven wheel driven in accordance with rotation of the drive wheel, and a connecting rod for operatively connecting the sieve unit with the driven wheel.

With such structure, rotary power of the drive wheel or the driven wheel can easily be converted to power moving the sieve unit in a back-and-forth direction.

The present invention also relates to a method of cleaning a sandy area, as further described herein.

EFFECTS OF THE INVENTION

The beach-cleaning trailer according to the present invention includes the pair of rail members provided on the upper edges of the respective side wall portions forming the box shape, respectively, in such a manner so as to face each other with the opening in between; and the sieve unit being capable of moving along the rail members and being detachably attached onto the rail members.

Accordingly, sieving can be performed by placing litter along with sand on the sieve unit using a scoop or the like, and by moving the sieve unit in a back-and-forth direction along the rail members. Therefore, the litter and the sand can easily be separated from each other, and only the litter can be collected. Thus, even on an area where litter collection is impossible using a beach cleaner, the litter can be separated and collected mechanically without collecting the litter through manual separation.

Moreover, the beach-cleaning trailer includes the driving mechanism that transmits rotary power of the wheels to the sieve unit to move the sieve unit in a back-and-forth direction along the rail members in accordance with the rotary power. Accordingly, when the wheels rotate during operation of the trailer, the sieve unit can move in a back-and-forth direction along the rail members. Such movement of the sieve unit allows the sieving to be performed mechanically by the sieve unit, and also makes it unnecessary to collect the litter through manual separation.

Furthermore, the driving mechanism is a crank mechanism to which the sieve unit is connected, by the connecting rod, to one of the drive wheel provided on the axle of the wheels and the driven wheel that rotates in accordance with the drive wheel. Accordingly, rotary power of the drive wheel or the driven wheel can easily be converted to power moving the sieve unit a back-and-forth direction, allowing the sieving to be performed by the sieve unit with a simple structure.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle to which the inventive trailer is connected, where the operator is seated on the driver's seat and facing forward. It should be understood that these terms are used for purposes of illustration, and are not intended to limit the invention.

With reference to the drawings, a preferred embodiment of the present invention will be described below.

Figure 1:
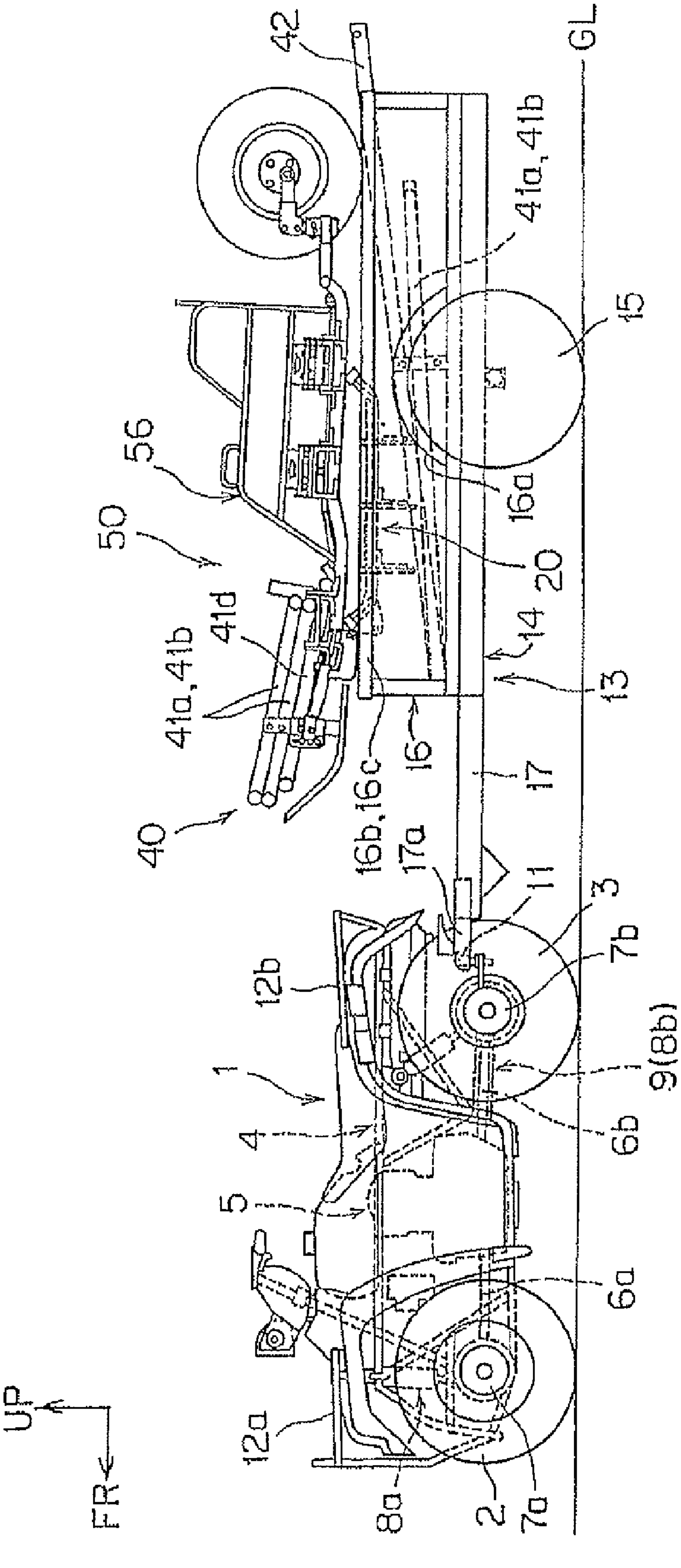
FIG. 1 is a side plan view of beach-cleaning equipment and a litter collection station loaded on a beach-cleaning trailer according to an illustrative embodiment of the present invention.

FIG. 1 is a side view of beach-cleaning equipment and a litter collection station loaded on a beach-cleaning trailer according to an illustrative embodiment of the present invention.

As shown in FIG. 1, a vehicle 1 includes a vehicle body, and left and right front wheels 2 and rear wheels 3 arranged at front and rear of the vehicle body. The vehicle body is generally small and lightweight. The front and rear wheels 2 and 3 are low-pressure balloon tires of relatively large diameter.

The vehicle 1 is an all terrain vehicle (ATV) having a large ground clearance thereby having an improved ability to especially travel on rough terrain. The vehicle includes a body frame 4 having a long box-shaped structure at a center portion of the vehicle 1 in a width direction thereof. An engine 5, which is a prime motor of the vehicle 1, is mounted on the body frame 4 substantially at a center portion thereof.

The engine 5 is a water-cooled single-cylinder engine, and outputs rotary power of the crankshaft to front and rear propeller shafts 6*a* and 6*b* via a gear-mesh-type transmission. The engine 5 may be air-cooled single-cylinder or a multi-cylinder engine. The rotary power thus outputted to the front and rear propeller shafts 6*a* and 6*b* is then transmitted to the left and right front wheels 2 and rear wheels 3 via front and rear speed reducers 7*a* and 7*b*, respectively.

The vehicle 1 is a semi-automatic vehicle capable of changing the gear ratio of the transmission electrically. Through, for example, a centrifugal clutch, the gear ratio can be changed without clutch operations but only with operations such as pushing a change button. Such semi-automatic vehicle 1 is suitable for travel with heavy load as well as for travel at constant speed, compared to a vehicle including a belt-type transmission.

The left and right front wheels 2 are suspended on a front portion of the body frame 4 via a front suspension 8*a*, which is an independent suspension. The left and right rear wheels 3 are suspended on a rear portion of the body frame 4 via a swing arm type rear suspension 8*b*. A rear end portion of a swing arm 9 of the rear suspension 8*b* has a trailer hitch 11 for towing a trailer 13. Moreover, as shown in FIG. 1, a front carrier 12*a* is supported on a front portion of the body frame 4, and a rear carrier 12*b* is supported on a rear portion of the body frame 4.

The vehicle 1 is capable of towing the trailer 13 carrying a primary beach cleaner (a first beach cleaner) 20, a secondary beach cleaner (a second beach cleaner) 50, a litter collection station 40, and a sieve unit 205, which are described later.

The trailer 13 is a box-shaped trailer, i.e., the trailer 13 includes a vertical shallow box having an open top. The trailer 13 has a pair of left and right wheels 15 at a substantially center portion thereof in a front-rear direction of the vehicle body. A loading unit 16 is arranged in the vertical shallow box. The trailer 13 includes a tow arm 17 extending frontwardly from a lower front portion thereof. The tow arm 17 includes a hitch coupler 17*a* arranged at front end portion thereof. The hitch coupler 17*a* corresponds to the trailer hitch 11.

A portion of the litter collection station 40 (a part of separated bodies constituting the litter collection station 40) is accommodated in the loading unit 16. The first and second beach-cleaning equipment 20 and 50 and the portion of the litter collection station 40 are mounted on the loading unit 16. The beach-cleaning equipment 20 and 50 and the litter collection station 40 can be carried to a work place by the vehicle 1 towing the trailer 13 as loaded above. The frame of the loading unit includes left and right side edge members 16*b* and 16*c*, respectively.

Figure 2:
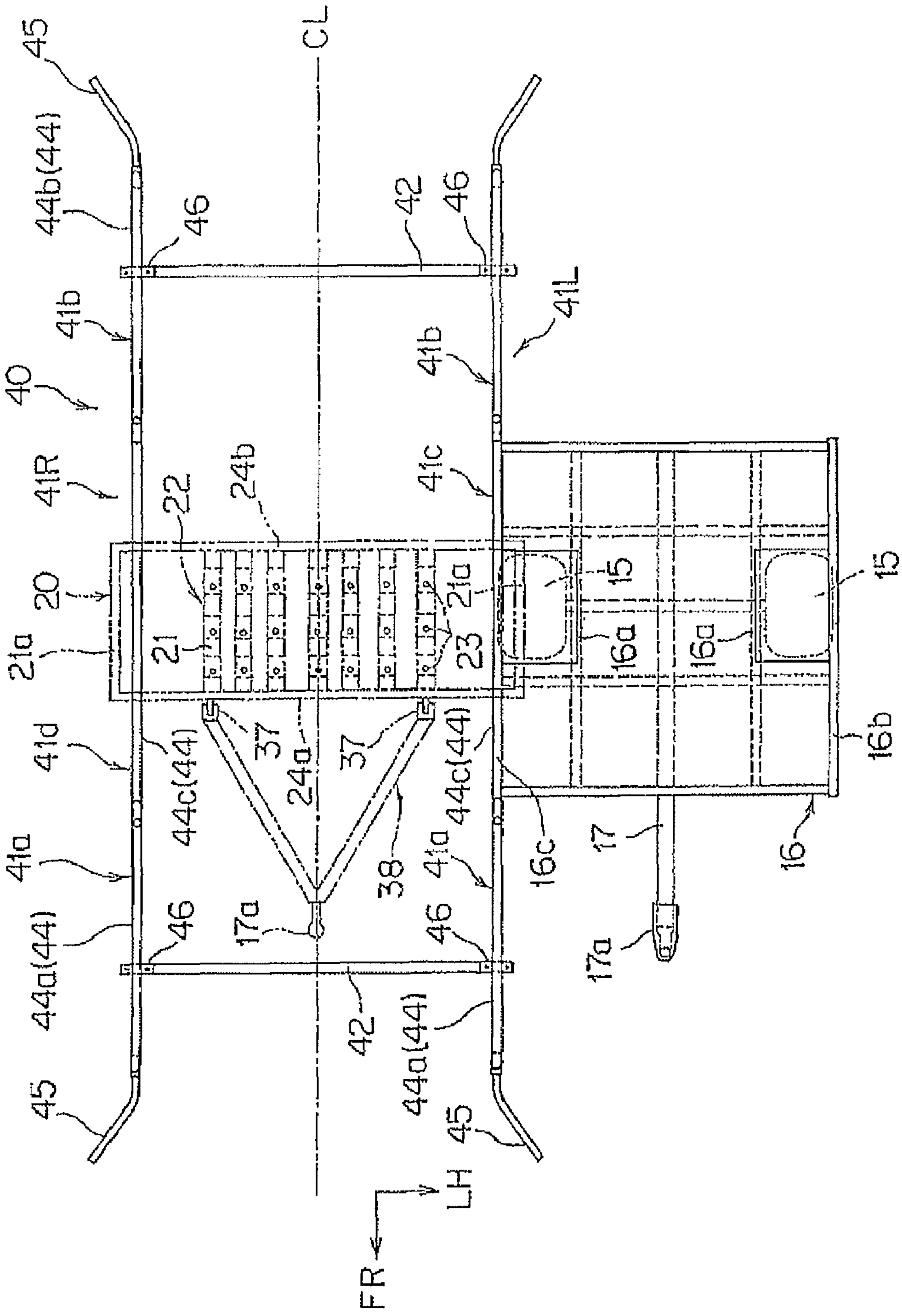
FIG. 2 is a top plan view of the litter collection station, in an assembled state thereof.

FIG. 1 shows a state in which the beach-cleaning equipment 20 and 50 and the litter collection station 40 are loaded in the trailer 13. FIG. 2 and subsequent drawings show states in which the beach-cleaning equipment 20 and 50 and the litter collection station 40 are being used on the sands, unless otherwise noted. Moreover, the state shown in FIG. 1, specifically, a state in which the trailer 13 has both wheels 15 on the ground and the loading unit 16 maintained at a certain height horizontally, is called a towed state of the trailer 13.

In addition, in the drawings, a line GL indicates a ground surface (an upper surface of the sands), and a line CL (in FIGS. 2 and 5) indicates the transverse center of the vehicle 1, the beach-cleaning equipment 20 and 50 towed by the vehicle 1, and the litter collection station 40 between which the vehicle 1 and the beach-cleaning equipment 20 and 50 pass through (the vehicle, beach-cleaning equipment, and litter collection station are collectively called the vehicle and the like below).

Moreover, an arrow FR indicates the front of the vehicle and the like in the traveling direction (front-rear direction). An arrow UP indicates the upside of the vehicle and the like in the vertical direction. An arrow LH (in FIGS. 2 and 5) indicates the left side of the vehicle.

The beach-cleaning equipment 20 and 50 each collect various kinds of litter scattered on the sands while traveling on the sands (beach) on a coast or the like by being towed by the vehicle 1. The litter collected by the beach-cleaning equipment 20 and 50 is collected together at the litter collection station 40 set up at a certain place on the sands. The beach-cleaning equipment 20 and 50 and the litter collection station 40 are each formed by appropriately assembling multiple types of steel product, such as stainless steels, with bonding means such as welding, for example. It may be noted that the beach-cleaning equipment 20 and 50 may be towed by a tractor.

Figure 3:
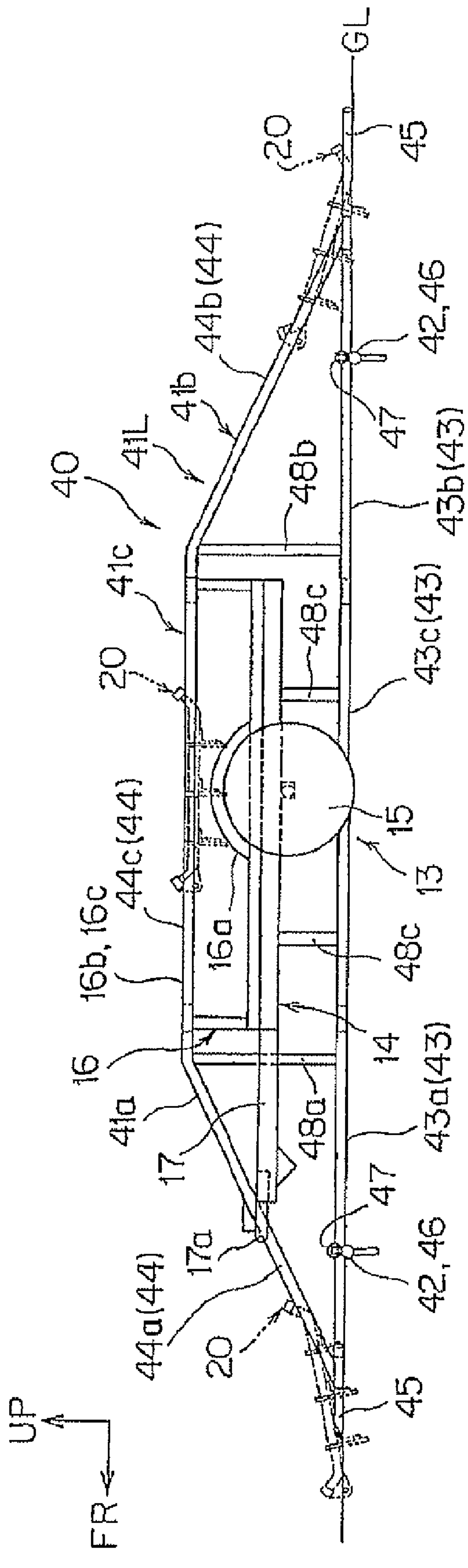
FIG. 3 is a side plan view of the litter collection station, in an assembled state thereof.

FIG. 2 is a plan view showing the primary beach cleaner 20 lifted up on the litter collection station 40. FIG. 3 is a left-side view of the primary beach cleaner 20 lifted up on the litter collection station 40 shown in FIG. 2.

The primary beach cleaner 20 is formed as follows. Specifically, as shown in FIG. 2, multiple (e.g., 15) longitudinal members 21 extending in the traveling direction of the vehicle 1 are arranged in the width direction (left-right direction) at substantially equal intervals thereby forming frame 22 shaped like a duckboard with parallel slats. Moreover, multiple sand pins 23 are detachably attached to each of the longitudinal members 21 in such a manner as to protrude downward. It may be noted that the primary beach cleaner 20 has a left-right symmetric structure.

The longitudinal members 21, for example, are circular steel pipes (or may be square steel pipes), and are arranged extending in the front-rear direction. Each longitudinal member 21 has a front end portion curved obliquely upward and frontward, and a rear end portion curved obliquely upward and rearward.

Front and rear transverse members 24*a* and 24*b* extend transversely further beyond the outermost longitudinal members 21. A side longitudinal member 21*a* is arranged between left end portions of the respective front and rear transverse members 24*a* and 24*b*. Similarly, another side longitudinal member 21*a* is arranged between right end portions of the respective front and rear transverse members 24*a* and 24*b*. The side longitudinal members 21*a* have a curvature similar to a curvature of the longitudinal members 21.

Further, a brace-shaped assist member 21*b* is arranged across a front portion or rear portion of the rightmost longitudinal member 21, and across a portion that the front or rear transverse member 24*a* or 24*b* extends further rightward. Another brace-shaped assist member 21*b* is arranged across a front or rear portion of the leftmost longitudinal member 21 and a portion that the front or rear transverse member 24*a* or 24*b* extends further leftward.

The frame 22 formed of these has a transversely-long rectangular shape, when viewed in a top view. The left-right width of the frame 22 is greater than a width of the vehicle 1 (see FIG. 2), and is also greater than a distance between left and right side structure bodies 41R and 41L of the litter collection station 40 (described later).

Accordingly, when the primary beach cleaner 20 towed by the vehicle 1 enters between the left and right side structure bodies 41R and 41L, left and right side portions of the frame 22 of the primary beach cleaner 20 climb up on the respective left and right side structure bodies 41R and 41L. Therefore, the primary beach cleaner 20 is lifted up to a certain height. It may be noted that, since the left-right width between the left and right side structure bodies 41R and 41L is greater than that of the vehicle 1, the vehicle 1 can pass through between the left and right side structure bodies 41R and 41L.

When the primary beach cleaner 20 travels on the sands, the sand pins 23 catch or hitch scattered litter of relatively large size (such as ropes, nets, and driftwoods) thereby raking such litter.

In the frame 22, a tow member 37 is arranged to a front portion of the longitudinal member 21 on, for example, the third from the leftmost longitudinal member 21 and that from the rightmost longitudinal member 21. The tow members 37 allow the vehicle 1 to tow the primary beach cleaner 20, and are shaped as thick plates extending perpendicular to the left-right direction. A connection hole (not shown) is formed in each of the tow members 37 at a front end portion thereof. A tow rod 38 is connected to the trailer hitch 11 of the vehicle 1 at one end, and to the connection hole at the other end thereof. The primary beach cleaner 20 is towed by the vehicle 1 via the tow rod 38.

When viewed in a top view, the tow rod 38 has a shape in which the other ends extend from the one end connected to the trailer hitch 11, toward the respective left and right tow members 37 in a V or Y shape (FIG. 2). The one end is provided with the hitch coupler 17*a* corresponding to the trailer hitch 11.

As shown in FIG. 3, when the primary beach cleaner 20 is lifted up on the litter collection station 40, as discussed above, the sand pins 23 are spaced away from the upper surface of the sands enough in order to drop the litter raked by the sand pins 23. Accordingly, the litter can be collected collectively with the sand.

As shown in FIGS. 2 and 3, the litter collection station 40 is constructed by integrally connecting the left and right side structure bodies 41R and 41L to each other with a pair of front and rear connection members 42. The litter collection station 40 has a left-right and front-rear symmetric structure, except for, for example, the structure of a center portion in the front-rear direction of each of the left and right side structure bodies 41R and 41L.

Each of the left and right side structure bodies 41R and 41L is shaped as a trapezoid by arranging a ground member 43 and a guide member 44. The ground member 43 is formed of, for example, a circular steel pipe. The ground member 43 extends in the front-rear direction. The guiding member 44 is formed of, for example, a circular steel pipe and shaped as a mountain of gradual slope, when viewed in a side view. The guiding member 44 is positioned above the ground member 43. The front end portions of the ground member 43 and the guiding member 44 are connected to each other integrally. Also, rear end portions of the ground member 43 and the guiding member 44 are connected to each other integrally.

A foot member 45 is detachably attached to each of front and rear portions of the left and right ground members 43. When viewed in a top view, the foot members 45 attached to the front portions is arranged such that they incline leftward and rightward, respectively, as they extend frontward; and the foot members 45 attached to the rear portions incline leftward and rightward, respectively, as they extend rearward. The foot members 45 are placed on the sands together with the corresponding ground members 43. Therefore, the litter collection station 40 can be stably set up with its widened ground contact area.

The connection members 42 are each formed of, for example, a circular steel pipe and extended in the left-right direction. The connection members 42 integrally connect the left and right side structure bodies 41R and 41L to each other with the end portions of the connection members 42 detachably inserted into corresponding connection pipes 46 provided under front portions and rear portions of the ground members 43. The litter collection station 40 being relatively large can be divided into multiple separate bodies (the left and right side structure bodies 41R and 41L and the front and rear connection members 42).

Further, each of the left and right side structure bodies 41R and 41L can be separated into three separate bodies, i.e., the front, middle, and rear bodies. Specifically, the left side structure body 41L can be separated into a left front separate body 41*a*, a left middle separate body 41*c*, and a left rear separate body 41*b*. Similarly, the right side structure body 41R can be separated into a right front separate body 41*a*, a right middle separate body 41*d*, and a right rear separate body 41*b*.

The connection pipes 46 at the front and rear of the ground members 43 are each formed of a relatively short circular steel pipe and extends in the left-right direction. Each of the connection pipes 46 is integrally connected to the corresponding ground member 43 by fitting its upper circumference into a notch formed in a lower part of the ground member 43. Accordingly, the connection pipe 46 protrudes downward from the lower face of the ground member 43, and is therefore buried in the sand when the litter collection station 40 is set up on the sands, preventing the litter collection station 40 from moving.

A locking pin 47 is inserted through each pair of the connection member 42 and the connection pipe 46. The locking pin 47 protrudes downward into the sand at a certain degree. In other words, the locking pins 47 prevent the litter collection station 40 getting displaced (moved away) from a certain place where it is set up. The litter collection station 40 can be separated into the left and right side structure bodies 41R and 41L and the front and rear connection members 42 by removing the locking pins 47, and thus separating the connection members 42 from the corresponding connection pipes 46.

The front separate body 41*a* of each of the left and right side structure bodies 41R and 41L mainly includes a front inclination member 44*a* of the guiding member 44, a front horizontal portion 43*a* of the ground member 43, and a substantially-vertical front support member 48*a*. The front horizontal portion 43*a* is located below the front inclination member 44*a*. The front support member 48*a* arranged between a rear end portion of the front inclination member 44*a* and that of the front horizontal portion 43*a*.

On the other hand, the rear separate body 41*b* of each of the left and right side structure bodies 41R and 41L consists mainly of a rear inclination member 44*b* of the guiding member 44, a rear horizontal member 43*b* of the ground member 43, and a substantially-vertical rear support member 48*b*. The rear horizontal member 43*b* is located under the rear inclination member 44*b*. The rear support member 48*b* arranged between a front end portion of the rear inclination member 44*b* and that of the rear horizontal member 43*b*. It may be noted that the front and rear separated bodies 41*a* and 41*b* have the substantially similar shape in the present embodiment, and that they can be switched from front to rear.

In the present embodiment, the trailer 13 in the towed state constitutes the left middle separate body 41*c*. Specifically, the right side wall portion 16*c* of the loading unit 16 of the trailer 13 in the towed state is formed as a single substantially-horizontal bar, and constitutes a substantially-horizontal top edge portion 44*c* of the guiding member 44. When the trailer 13 is in the towed state and the litter collection station 40 is set up on the sands, the height of the right side wall portion 16*c*, which is a right top edge portion of the loading unit 16, is substantially similar as the height of the top edge portion 44*c* of the guiding member 44 (in an in-use state). It may be noted that, in the towed state, the trailer 13 can stand alone using a supporting leg (not shown).

The front inclination member 44*a* of the front separate body 41*a* can be attached and detached at a rear end portion thereof to and from a front end portion of the right side wall portion 16*c*. Similarly, the rear inclination member 44*b* of the rear separate body 41*b* can be attached and detached at front end portion thereof to and from a rear end portion of the right side wall portion 16*c*. The front end portion and the rear end portion of the right side wall portion 16*c* are connected, by using certain retaining mechanisms, to the rear end portion of the front inclination member 44*a* and the front end portion of the rear inclination member 44*b*, respectively, while not allowed to be taken further in or out. The front and rear inclination members 44*a* and 44*b* can be separated from the right side wall portion 16*c* by removing the retainer mechanisms.

With such a configuration, since the right side wall portion 16*c* of the trailer 13 constitutes a portion of the left side structure body 41L, the trailer 13 is located to the immediate left of the litter collection station 40 in a set-up state.

On the other hand, the right middle separate body 41*d* mainly includes the substantially-horizontal top edge portion 44*c* of the guide member 44, a middle horizontal portion 43*c* of the ground member 43, and multiple (a pair, in this embodiment) substantially-vertical middle support members 48*c*. The middle horizontal portion 43*c* is located under the top edge portion 44*c*. The middle support members 48*c* are arranged between the top edge portion 44*c* and the middle horizontal portion 43*c*. The right middle separate body 41*d* is shaped like a ladder, when viewed in a side view.

The front inclination member 44*a* of the front separate body 41*a* can be attached and detached, at its rear end portion, to and from a front end portion of the top edge portion 44*c*. Likewise, the rear inclination member 44*b* of the rear separate body 41*b* can be attached and detached, at its front end portion, to and from a rear end portion of the top edge portion 44*c*.

Further, the front horizontal portion 43*a* of the front separate body 41*a* can be attached and detached, at its rear end portion, to and from a front end portion of the middle horizontal portion 43*c*. The rear horizontal member 43*b* of the rear separate body 41*b* can be attached and detached, at its front end portion, to and from a rear end portion of the middle horizontal portion 43*c*.

The front end portion and the rear end portion of the top edge portion 44*c* are connected, using certain retaining mechanisms, to the rear end portion of the front inclination member 44*a* and the front end portion of the rear inclination member 44*b*, respectively, while allowed to be taken further in or out. The front and rear inclination members 44*a* and 44*b* can be separated from the top edge portion 44*c* by removing the retaining mechanisms.

Similarly, the front end portion and the rear end portion of the middle horizontal portion 43*c* are connected, using certain retaining mechanisms, to the rear end portion of the front horizontal portion 43*a* and the front end portion of the rear horizontal member 43*b*, respectively, while allowed to be taken further in or out. The front and rear horizontal members 43*a* and 43*b* can be separated from the middle horizontal portion 43*c*, by removing the retaining mechanisms. It may be noted that a member corresponding to the middle horizontal portion 43*c* can be provided to the left side structure body 41L.

The substantially-horizontal left side edge member 16*b* of the loading unit 16 of the trailer 13 can be used as the top edge portion 44*c* of the guide member 44, like the right side edge member 16*c*. The left-right width between the left and right side edge members 16*b* and 16*c* are substantially the same as that between the left and right side structure bodies 41R and 41L. Accordingly, when a front end portion of the rear inclination member 44*b* of each of the rear separated bodies 41*b* is connected to a corresponding rear end portion of the left and right side edge members 16*b* and 16*c* of the loading unit 16, the same structure as the rear portion of the litter collection station 40 in the set-up state can be reproduced.

This allows the primary beach cleaner 20 (and the secondary beach cleaner 50) loaded on the loading unit 16 to be unloaded on the sands by sliding it down along the top edge portions 44*c* and the rear inclination members 44*b* of the left and right guide members 44. On the other hand, the primary beach cleaner 20 (and the secondary beach cleaner 50) on the sands can be loaded onto the loading unit 16 by sliding it up along the rear inclination members 44*b* and the top edge portions 44*c* of the left and right guide members 44. The above state of the trailer 13 in which the left and right side edge members 16*b* and 16*c* are connected to the respective rear separated bodies 41*b* is called a load-unload operation state.

Figure 4:
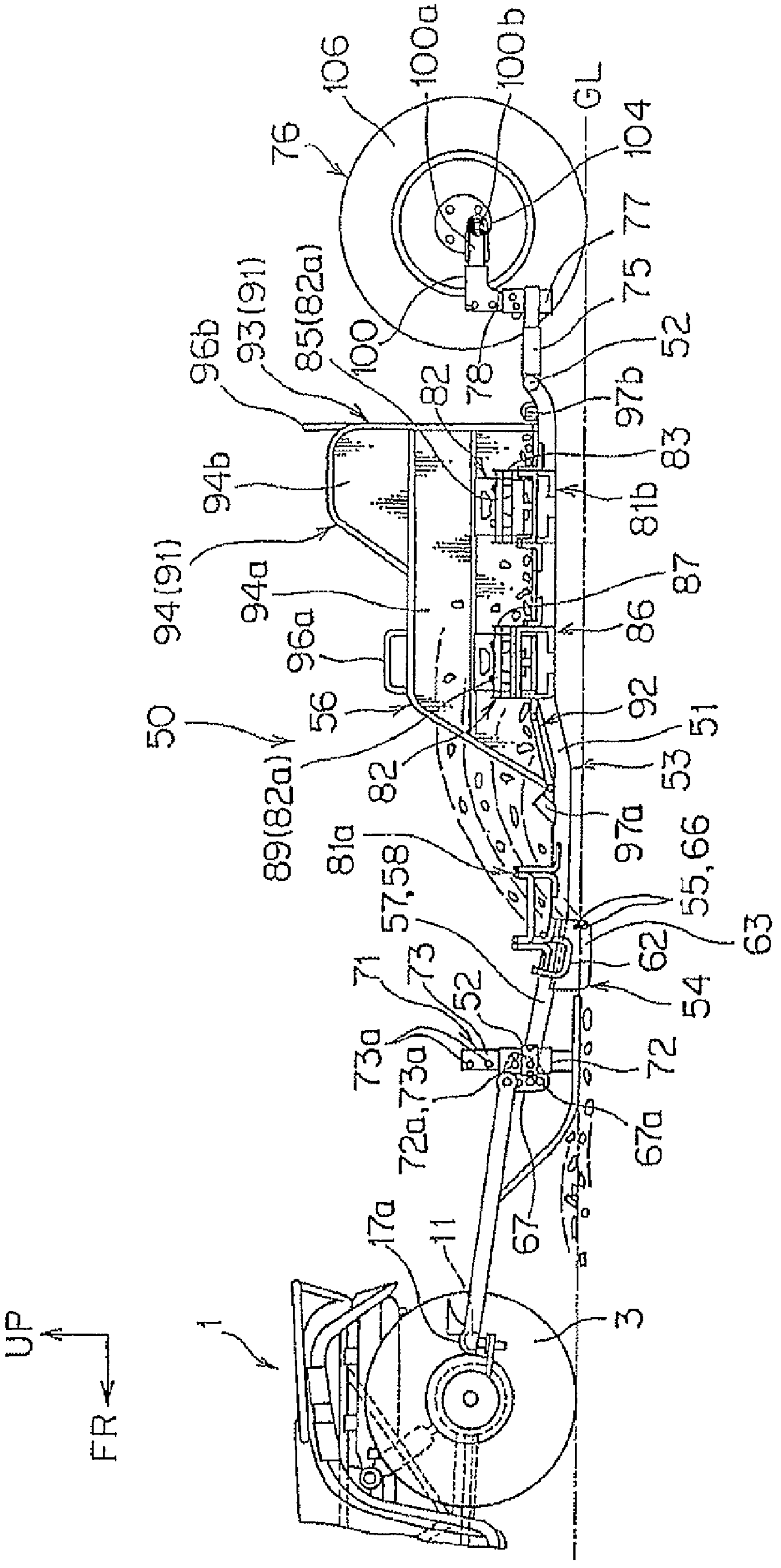
FIG. 4 is a side plan view a secondary beach cleaner in a state towed by a vehicle during litter collecting operation.
Figure 5:
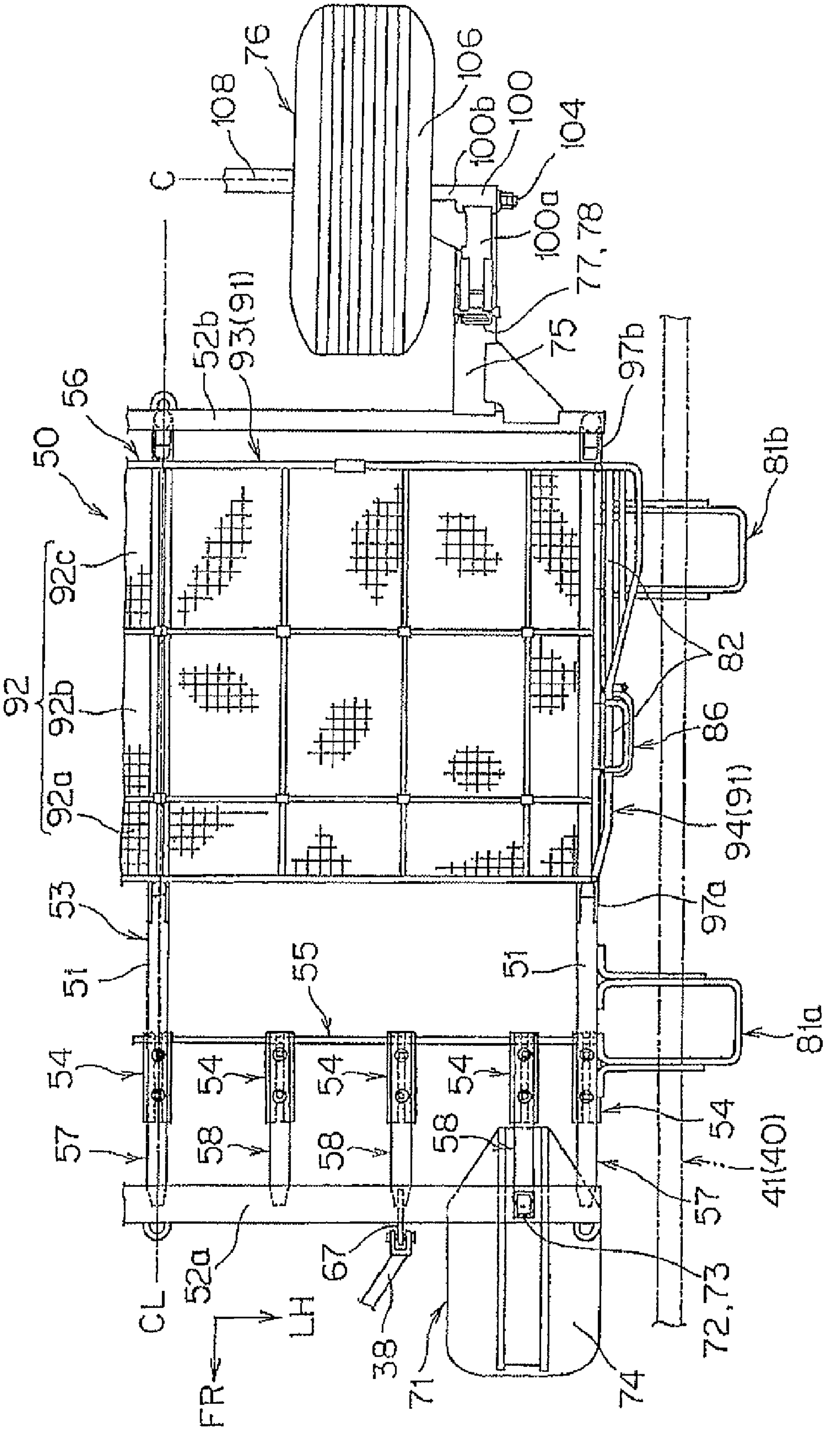
FIG. 5 is a partial top plan view of the secondary beach cleaner.

FIG. 4 is a side view showing a state of the secondary beach cleaner 50 during towing thereof by the vehicle. FIG. 5 is a plan view of the secondary beach cleaner 50.

The secondary beach cleaner 50 has a frame 53 which mainly includes multiple (e.g., 3) longitudinal members 51 and front and rear transverse members 52*a* and 52*b*. The longitudinal members 51 extend in the vehicle traveling direction. The front and rear transverse members 52*a* and 52*b* extend in the width direction (left-right direction) while intersecting the longitudinal members 51 substantially at right angles. The frame 53 has keels 54 and scrapers 55 at a front portion thereof, and a mesh body 56 (described later) at a rear portion thereof. It may be noted that the secondary beach cleaner 50 has a left-right symmetric structure, too.

The longitudinal members 51 are each formed of, for example, a circular steel pipe, and are arranged extending in the front-rear direction. Each of the longitudinal members 51 is moderately cranked at longitudinal-center portion thereof, when viewed in a side view, such that rear portion thereof may be displaced slightly higher than the front portion.

Further, by moderately bending a longitudinal-center portion of a front portion of the longitudinal member 51, a front half of the front portion inclines frontward and upward slightly. The front half of the front portion of the longitudinal member 51 is called a front inclination portion 57. On the other hand, the rear end portion of the longitudinal member 51 curves upwardly.

The multiple longitudinal members 51 are transversely arranged parallel to each other so that they overlap, when viewed in a side view. The front and rear transverse members 52*a* and 52*b* are each formed of, for example, a steel pipe, and extend in the left-right direction. Front ends of the respective longitudinal members 51 are brought to the front transverse member 52*a* from rear and thus connected thereto.

Similarly, rear ends of the respective longitudinal members 51 are brought to the rear transverse member 52*b* from below and thus connected thereto. The frame 53 mainly including the longitudinal members 51 and the transverse members 52*a* and 52*b* is shaped substantially square, when viewed in a top view. It may be noted that the left-right width of the frame 53 is less than a distance between the left and right side structure bodies 41R and 41L of the litter collection station 40.

A plural (e.g., 3) scraper frames 58 are transversely arranged parallel to each other, between the transverse-center longitudinal member 51 and the left longitudinal member 51, as well as between the center longitudinal member 51 and the right longitudinal member 51. The scraper frames 58 incline so that they can overlap with the front inclination portions 57 of the longitudinal members 51, when viewed in a side view. The scraper frames 58 are each formed of a circular steel pipe (or may be a square steel pipe) having the same or similar diameter as the longitudinal member 51.

Front ends of the respective scraper frames 58 are brought to the front transverse member 52*a* from rear, and thus connected thereto. On the other hand, rear ends of the respective scraper frames 58 are free ends, i.e., rear end of the scrapper frames 58 are not connected to any other component. It may be noted that, while the scraper frames 58 are arranged at substantially equal intervals from the center longitudinal member 51, a smaller interval is provided between the leftmost scraper frame 58 and the left longitudinal member 51, and between the rightmost scraper frame 58 and the right longitudinal member 51.

The keels 54 and the scrapers 55 are attached to the front inclination portions 57 of the longitudinal members 51 and the scraper frames 58. The keels 54 and the scrapers 55 are churn-up members. The keels 54 and the scrapers 55 rake sand and relatively small litter (such as beverage containers, wastepaper, and cigarette butts) during moving the secondary beach cleaner 50 on a beach when towed by a vehicle.

The keels 54 are detachably attached to a rear portion of respective front inclination portions 57 of the longitudinal members 51, and to respective the scraper frames 58 (FIG. 5). The keel 54 includes a plate member 61, a C-shaped pin 62, and a keel body 63. The plate member 61 curves so that it can fit around the lower outer surface of the front inclination 57 or of the scraper frame 58. The C-shaped pin 62 is shaped like a squared C having an opening at the top, when viewed in a side view, and both sides of the C-shaped pin 62 penetrate the plate member 61. The keel body 63 is shaped like a plate perpendicular to the left-right direction, and extends downward from a lower end edge of the plate member 61.

Each keel 54 (keel body 63) has multiple scraper support holes 66 formed in the rear end portion thereof, and each of the scrapers 55 is inserted into these scraper support holes 66 and supported thereby. The scrapers 55 are each shaped like, for example, a bar having a circular cross section, and supported by the upper and lower scraper support holes while extending in the left-right direction across the keels 54 by being inserted into the respective upper and lower scraper support holes 66. The number of the scrapers 55 to be supported can be selected depending on the beach and litter conditions, and multiple scrapers 55 can be supported as well.

Both the ends of the scrapers 55 are subjected to a certain retaining measure, such as insertion of a locking pin, to prevent the scrapers 55 from falling off from the keels 54. It may be noted that the sectional shape of the scraper 55 is not limited to a circle, and may be a semicircle having a top face inclined frontward and downward, or other shape. The number of the scrapers 55 may be one or more than three, and the scrapers 55 may be arranged not only in a manner that one is arranged above another, but in a manner that one is arranged on the right or left of another, or in a manner extending obliquely.

The secondary beach cleaner 50 is configured such that the keels 54 and the scrapers 55 are buried in the sand to an appropriate degree. When the secondary beach cleaner 50 travels in such a state, the keels 54 rake the sand and litter and then the scrapers 55 scrape them up. Accordingly, the sand and litter thus churned up are thrown up into the mesh body 56 at the rear portion of the frame 53.

A tow member 67 is provided at a front of each of the scraper frames 58 which are, for example, the second ones from the leftmost edge and the rightmost edge, respectively, of the frame 53. The tow members 67 allow the vehicle 1 to tow the secondary beach cleaner 50, and are shaped as thick plates extending perpendicular to the left-right direction.

A plural (e.g., 4) connection holes 67*a* are formed in each of the tow members 67 in a vertically-arranged manner. The tow rod 38 connected to the trailer hitch 11 of the vehicle 1 at one end thereof is connected to any one pair of these connection holes 67*a* at the other end. The secondary beach cleaner 50 is towed by the vehicle 1 via the tow rod 38.

An optimal towing position depends on the clearance between the secondary beach cleaner 50 and the ground. An optimal towing position can be set by adjusting and selecting a pair of the connection holes 67*a* to be connected the other end of the tow rod 38. It may be noted that the left-right interval between the left and right tow members 67 is substantially the same as that between the left and right tow members 37.

A front ski support pipe 72 is provided at a front of each of the scrape frames 58 which are, for example, the leftmost one and the rightmost one, respectively, of the frame 53. The ski support pipes 72 support respective front ski legs 71. The front ski support pipes 72 are each formed of, for example, a square steel pipe, and penetrate the front transverse member 52*a* vertically.

A leg member 73 of each of the front ski legs 71 is also formed of a square steel pipe. The leg member 73 is supported by the corresponding front ski support pipe 72 by being inserted into it. The front ski legs 71 allow the front portion of the secondary beach cleaner 50 to be positioned at a certain height from the ground (height from an upper surface of the sands), and also improve the ability to slide on the sands. Each of the front ski legs 71 is formed by placing the leg member 73 upright on a front ski plate 74 having a front portion curved frontward and upward, and having a predetermined width.

The front ski support pipes 72 each have left and right through-holes 72*a* formed therein. The leg member 73 has a plural (e.g., 4) pairs of left and right through-holes 73*a* corresponding to the left and right through-holes 72*a*. The pairs of the through-holes 73*a* are arranged vertically. A locking pin or the like is inserted into a hole obtained by overlapping the left and right through-holes 72*a* of the front ski support pipe 72 with a pair of the left and right through-holes 73*a*.

The height of the front portion of the frame 53 from the front ski leg 71 is thus determined, so that the height of the front portion of the secondary beach cleaner 50 to the ground is set to a certain height. In other words, the height of the front portion of the secondary beach cleaner 50 from the ground is adjustable by selecting a pair of the left and right through-holes 73*a* of the leg member 73 to insert the locking pin or the like into. Therefore, the degree to which the keels 54 and the scrapers 55 are buried in the sand is adjustable.

Rear legs 76 are supported at both sides of a rear portion of the rear transverse member 52*b*. Each of the rear legs 76 includes an extension frame 75, a rear leg support pipe 77, a leg member 78, an arm member 100, a left or right wheel 106, and a rotating shaft 104. The extension frame 75 extends from either side of a rear portion of the rear transverse member 52*b*, and the rear leg support pipe 77 is provided at a rear end portion of the extension frame 75.

The leg member 78 penetrates the rear leg support pipe 77. The arm member 100 includes an arm 100*a* extending rearward, from a top part of the leg member 78 and an arm 100*b* extending inward in the vehicle width direction, from a rear end portion of the arm 100*a*. The centers C of the left and right wheels 106 are connected to each other with an axle 108.

The rotating shaft 104 is inserted into the arm 100*b*, which is de-centered from the wheel center C. The rear leg 76 is used for setting the height of a rear portion of the secondary beach cleaner 50 from the ground (height from the upper surface of the sands) to a predetermined height and for vibrating the rear portion of the frame 53 vertically.

Front lift arms 81*a* are arranged at a front portion of the frame 53, each on the outer left side and the outer right side from which they extend leftward and rightward, respectively. Similarly, rear lift arms 81*b* are arranged at a rear portion of the frame 53, each on the outer left side and the outer right side from which they extend leftward and rightward, respectively. The front and rear lift arms 81*a* and 81*b* are each shaped like, for example, a frame of transversely-long square, when viewed in a top view. A transverse-middle portion of each lift arm is substantially horizontal.

A transverse-inner portion and a transverse-outer portion of each lift arm are formed bending inward and downward, and bending outward and downward, respectively. The left-right width between the transverse-outer edges of the respective front lift arms 81*a*, and the left-right width between the transverse-outer edges of the respective rear lift arms 81*b* are larger than a distance (width) between the left and right side structure bodies 41R and 41L of the litter collection station 40 (i.e., substantially the same as the left-right width of the frame 22 of the primary beach cleaner 20). Accordingly, when the secondary beach cleaner 50 enters between the left and right side structure bodies 41R and 41L, the lift arms 81*a* and 81*b* climb up on the respective left and right side structure bodies 41R and 41L. Therefore, the secondary beach cleaner 50 is lifted up to a certain degree.

When the secondary beach cleaner 50 is lifted up on the litter collection station 40, as discussed above, the mesh body 56 at a rear portion of the frame 53 rises to a certain height. Work of collecting litter collected in the mesh body 56 can be easily performed by rotating the mesh body 56 via a hinge 82 provided on its left. Since the trailer 13 is adjacent to the left of the litter collection station 40, the litter is directly thrown into the loading unit 16 of the trailer 13.

The rear lift arm 81*b* on the left side of the frame 53 is provided with a rear hinge bracket 83 which constitutes a part of the hinge 82 rotatably supporting a left side portion of the mesh body 56. The rear hinge bracket 83 arranged across foot ends of the rear lift arm 81*b*. A rear hinge pipe 85 corresponding to the rear hinge bracket 83 is provided at the left side of the mesh body 56. The rear hinge pipe 85 is rotatably supported in a pivoting manner by the rear hinge bracket 83 via a hinge pivot 82*a* extending in the front-rear direction.

Further, a frame-shaped support arm 86 is located at a position slightly forward of the lift arm 81*b*. A width in a left-right direction for the support arm 86 is less than a width of the lift arm 81*b*. The support arm 86 supports a front hinge bracket 87 having a structure similar to a structure of the rear hinge bracket 83. A front hinge pipe 89 corresponding to the front hinge bracket 87 is provided at the left side of the mesh body 56. The front hinge pipe 89 is rotatably supported by the front hinge bracket 87 via the hinge pivot 82*a* extending in the front-rear direction. It may be noted that that the hinge pipes 85 and 89 and the hinge pivot 82*a* are coaxially provided.

The mesh body 56 is shaped as a box having open top and front. For example, the mesh body 56 is formed by attaching a metal mesh having a certain mesh size to a frame formed mainly of steel pipes. The positioning of the mesh body 56 in the front-rear direction is performed such that the mesh body

56 covers from a position a little forward of the front-rear center of the frame 53 to a vicinity of a rear end portion of the frame 53. As to the positioning in the left-right direction, the mesh body 56 is positioned to have substantially the same left-right width as the frame 53.

The mesh body 56 includes a bottom wall portion 92, a rear wall portion 93, and left and right side wall portions 94. When viewed in a top view, the bottom wall portion 92 is shaped transversely-long rectangular. The rear wall portion 93 extends substantially vertically from a rear edge of the bottom wall portion 92. The left and right side wall portions 94 extend from the respective side edges of the bottom wall portion 92 while moderately inclining leftward and rightward, respectively, as they extend upwardly. The rear wall portion 93 and the left and right side wall portions 94 form a fence member 91 that fences round the bottom wall portion 92, opening only the front side of the bottom wall portion 92. The fence member 91 allows litter churned up by the keels 54 and the scrapers 55 to be collected onto the bottom wall portion 92.

The bottom wall portion 92 includes an inclination portion 92*a* moderately inclining frontward and downward at a front portion thereof. A portion rearward of the inclination portion 92*a* is a horizontal portion which is substantially horizontal. The horizontal portion is sectioned into a front horizontal portion 92*b* and a rear horizontal portion 92*c* by a transverse member extending in the left-right direction.

Each of the side wall portions 94 of the mesh body 56 has a side wall body 94*a* and a rear protruded portion 94*b*. The side wall body 94*a* is a longitudinally-long rectangular in a side view and located on a corresponding one of the sides of the bottom wall portion 92. The rear protruded portion 94*b* is trapezoid-shaped, when viewed in a side view, and is located on a rear of the side wall body 94*a*.

The rear side of the side wall body 94*a* and the rear side of the rear protruded portion 94*b* extend substantially vertically, and are continuous in a substantially straight line, when viewed in a side view. The continuous rear sides are the sides of the rear wall portion 93 of the mesh body 56. The top edge of each of the side wall portions 94 (rear protruded parts 94*b*) has substantially the same height as the top edge of the rear wall portion 93.

Front and rear hinge plates 95*a* and 95*b* are arranged on the respective front and rear portions of the left side wall portion 94 of the mesh body 56. The front and rear hinge plates 95*a* and 95*b* are arranged across a middle frame and a bottom frame of the left side wall portion 94. Each of the hinge plates 95*a* and 95*b* is a substantially square-shaped plate, when viewed in a side view, and is lightened through a cut-out, leaving an outer edge portion and diagonal-line portions. Each of the hinge plates 95*a* and 95*b* curves inward transversely at front and rear edge portions and serves as an enforcement flange. Front and rear hinge pipes 89 and 85 are integrally joined to outer faces of the hinge plates 95*a* and 95*b*, respectively.

As described above, the left side portion of the mesh body 56 is rotatably connected to, and supported by the left side portion of the frame 53 via the hinge 82. When rotated via the hinge 82 by raising the right side of the mesh body 56 upwardly, the mesh body 56 is in a raised state in which the bottom wall portion 92 is substantially upright. Then, litter collected in the mesh body 56 falls onto the left side wall portion 94, and is discharged to the outside of the mesh body 56 via the left side wall portion 94.

Here, inclusion of handles 96*a* and 96*b* to certain parts (or at least a part on the opposite side of the hinge 82) of the fence member 91 of the mesh body 56 facilitates the work of collecting the litter collected in the mesh body 56 performed by rotating the mesh body 56. Further, by providing the hinge 82 to only one of the short sides (the left side) of the laterally-long mesh body 56, a distance from the rotating shaft (hinge pivot 82*a*) to the operation part (the right one of the handles 96*a* and 96*b*) is secured when the mesh body 56 is to be raised. The operation of rotating the mesh body 56 is thus facilitated.

The left side wall portion 94 of the mesh 56 (in other words, the wall portion of the fence wall 91 on the hinge 82 side) is a wall portion in which a plate member is fixed to allow favorable litter discharge. It is designed so that the top edge portion of the left side wall portion 94 of the mesh body 56 may extend more leftward than the left side structure body 41L of the litter collection station 40 in the raised state.

Thus, the litter collected in the mesh body 56 is directly thrown onto the loading unit 16 of the trailer 13 adjacent to the left of the litter collection station 40, using the left side wall portion 94 as a slope. It may be noted that the right side wall portion 94 and the rear wall portion 93 are mesh members in which, for example, a metal mesh having a rough mesh is fixed to prevent the litter thrown into the mesh body 56 from falling down.

Front-edge and rear-edge stoppers 97*a* and 97*b* are arranged on each of the left and right longitudinal members 51 in the frame 53 and used for positioning of the front and rear edges on the left and right sides of the mesh body 56. Each of the stoppers 97*a* and 97*b* has a substantially-vertical position restriction face and a rotation guide face continuous with the position restriction face from its top and inclining with the face up. The position restriction face abuts the front or rear edge of the mesh body 56. The stoppers 97*a* and 97*b* are detachably attached to the longitudinal members 51 by using, for example, bolts or the like.

When the mesh body 56 is in use (when the bottom wall portion 92 is set substantially horizontal and abuts the frame 53 from above), the mesh body 56 abuts, at its front edges on both sides, the position restriction faces of the left and right front-edge stoppers 97*a*. At the same time, the mesh body 56 when in use abuts, at rear edges on both sides thereof, the position restriction faces of the left and right rear-edge stoppers 97*b*. Therefore, the positioning of the mesh body 56 with respective to the frame in the front-rear direction is performed.

For the mesh body 56 to go back to the in-use state from the raised state by being rotated, the front and rear edges on both sides of the sides of the mesh body 56 are guided by the guide faces of the stoppers 97*a* and 97*b*, and thereby the mesh body 56 smoothly goes back to a certain position on the frame 53. Note that it may be designed such that the attachment positions for the stoppers 97*a* and 97*b* on the longitudinal members 51 are movable frontward and rearward to allow the mesh body 56 to be movable frontward and rearward.

Next, a description of an outline of procedures of cleaning the beach by using the beach-cleaning equipment 20 and 50 is provided.

As shown in FIG. 1, the beach-cleaning equipment 20 and 50 and the litter collection station 40 are first loaded in the trailer 13 and carried to a certain cleaning place. At this time, the beach-cleaning equipment 20 and 50 are each loaded in the trailer 13 in an integrally-assembled state, while the litter collection station 40 is loaded in the trailer 13 in a state separated into left and right pairs of the front and rear separated bodies 41*a* and 41*b*, the right middle separate body 41*d*, the front and rear connection members 42, and the foot members 45.

More specifically, first, one of the pairs of the front and rear separated bodies 41*a* and 41*b* (or a pair of the front or rear separated bodies) is mounted in the trailer 13 (is accommodated in the loading unit 16), and then the beach-cleaning equipment 20 and 50 are mounted. Here, the primary beach cleaner 20 is loaded in the following state.

The front and rear transverse members 24*a* and 24*b* of the frame 22 are mounted with their side parts on the left and right side edge members 16*b* and 16*c* of the loading unit 16 (the left and right side edge members 16*b* and 16*c* are namely the top edge portions 44*c* of the guide member 44 of the litter collection station 40). The rearward movement of the primary beach cleaner 20 is restricted by the leftmost and rightmost sand pins 23 at the rearmost row abutting, from front, respective outer faces of wheel cavities 16*a* of the loading unit 16.

On the other hand, the secondary beach cleaner 50 is loaded in the following state.

The longitudinal members 51 of the frame 53 are mounted on the front and rear transverse members 24*a* and 24*b* of the primary beach cleaner 20 in the aforementioned loaded state. Here, the secondary beach cleaner 50 is moderately inclined rearward and downward. The rearward movement of the secondary beach cleaner 50 is restricted by the keels 54 abutting the front transverse member 24*a* of the primary beach cleaner 20 from front.

Then, the other pair of the front and rear separate bodies 41*a* and 41*b* (or the other pair of the front or rear separate bodies) and the right middle separate body 41*d* of the litter collection station 40 are mounted in such a manner as to overlap over the front inclination portions 57 and the scraper frames 58 of the secondary beach cleaner 50 in the loaded state. Moreover, the connection members 42 are mounted on, for example, the right side on the loading unit 16 in a state inclining frontward and downward. The foot members 45 are accommodated at, for example, the left side on a rear of the loading unit 16.

It may be noted that the state how the litter collection station 40 is loaded is not limited to the one described above, and may be alternatively loaded in the following manner.

Specifically, only the right middle separate body 41*d* is mounted over the front inclination portions 57 and the scraper frames 58 of the secondary beach cleaner 50 in the loaded state. Then, for example, one pair of the front and rear separated bodies 41*a* and 41*b* is mounted on a rear of the secondary beach cleaner 50 in such a manner that they are arranged along the left and right direction. The other pair of the front and rear separated bodies 41*a* and 41*b* is mounted in the loading unit 16. The foot members 45 are appropriately distributed and accommodated on the loading unit 16 at its rear on the left and right.

Next, the beach-cleaning equipment 20 and 50 in the loaded state are unloaded on the ground. At this time, the rear separated bodies 41*b* are connected to the respective left and right side edge members 16*b* and 16*c* of the loading unit 16 of the trailer 13. Therefore, the trailer 13 is now in the load-unload operation state.

Then, the beach-cleaning equipment 20 and 50 in the loaded state are unloaded on the ground by sliding them along the left and right guide members 44. Accordingly, even when the beach-cleaning equipment 20 and 50 are each integrally assembled, they can be unloaded on the ground relatively easily. Moreover, speedy transition to the litter collection operations can be accomplished.

Subsequently, a set-up operation is performed in which the litter collection station 40 is set up at a certain place on the beach. First, the right side structure body 41R is formed in the following manner.

One of the rear separated bodies 41*d* which is connected to the left side edge member 16*b* of the loading unit 16 of the trailer 13 in the loading-unloading operation state is removed from the left side edge member 16*b*. Then, the rear separate body 41*b* thus removed, the right middle separate body 41*d*, and one of the front separated bodies 41*a* are connected to one another. Further, the left side structure body 41L is formed by connecting the other front separate body 41*a* to the right side wall portion 16*c* of the loading unit 16 of the trailer 13.

Then, the left and right side structure bodies 41R and 41L are connected to each other with the front and rear connection members 42. The foot members 45 are attached to corresponding places. The litter collection station 40 is thus assembled and is now in the set-up state.

Since the relatively large size litter collection station 40 is separated into the multiple separated bodies and the like and then loaded on the loading unit 16 in such a state, the operation of loading and unloading the litter collection station 40 in and from the trailer 13 can be easily performed.

Next, in order to collect relatively large size litter on the beach, the primary beach cleaner 20 is towed by the vehicle 1 to travel on the beach at a constant speed. The primary beach cleaner 20 collects the relatively large size litter on the beach while the sand pins 23 are buried in the sand. Accordingly, the primary beach cleaner 20 has a relatively large travel resistance and a travel speed set as low as 5 to 10 km/h.

When a certain amount of litter is collected under the frame 22 by traveling on the beach, as described above, the primary beach cleaner 20 is brought to the litter collection station 40. Then, the operation of collecting the litter thus collected is performed. After the vehicle 1 passes through between the left and right side structure bodies 41R and 41L of the litter collection station 40, the primary beach cleaner 20 enters between the left and right side structure bodies 41R and 41L.

At this time, the left and right side portions of the frame 22 climb up on the respective left and right side structure bodies 41R and 41L, and the primary beach cleaner 20 is thus lifted up by a certain degree (see FIG. 3). The vehicle 1 and the primary beach cleaner 20 are stopped when the primary beach cleaner 20 is on the top edge portions 44*c* of the guiding members 44 of the respective left and right side structure bodies 41R and 41L. Then, the operation of collecting the litter is performed.

Thereafter, the vehicle 1 and the primary beach cleaner 20 are operated on the beach to repeat the litter collection operations.

After a certain area is cleaned by the primary beach cleaner 20, the secondary beach cleaner 50 is towed to travel on the beach in the certain area (cleaned by the primary beach cleaner) to collect relatively small size litter on the beach. Use of the secondary beach cleaner 50 after the primary beach cleaner 20 in this manner prevents breakage of the keels 54, the scrapers 55, the mesh body 56, and the like which are configured to handle small size litter. When the secondary beach cleaner 50 travels, the beach has been ploughed up by the operation of the primary beach cleaner 20 and thus softened.

In addition, the secondary beach cleaner 50 needs to churn up the sand and litter with its keels 54 and scrapers 55. For these reasons, the travel speed of the secondary beach cleaner 50 is set to 15 to 25 km/h which is a little faster than that of the primary beach cleaner 20.

The secondary beach cleaner 50 churns up relatively small size litter along with sand with its keels 54 and the scrapers 55 by traveling on the beach, and the litter and the sand are collected in the mesh body 56 at a rear of the frame 53. Here, the metal mesh of the bottom wall portion 92 of the mesh body 56 is configured such that the mesh size may become smaller and smaller from its front to rear, i.e., the mesh size becomes gradually smaller from front to rear of the bottom wall portion 92. Such configuration substantially prevents the collected litter from falling down, and also prevents clogging of the metal mesh.

When a certain amount of litter is collected in the mesh body 56 by traveling on the beach as described above, the secondary beach cleaner 50 is returned to the litter collection station 40. Then, the operation of collecting the litter thus collected is performed. After the vehicle 1 passes through between the left and right side structure bodies 41R and 41L of the litter collection station 40, the secondary beach cleaner 50 enters between the left and right side structure bodies 41R and 41L. At this time, the left front and rear lift arms 81*a* and 81*b* and the right front and rear lift arms 81*a* and 81*b* of the secondary beach cleaner 50 climb up on the respective left and right side structure bodies 41R and 41L.

The secondary beach cleaner 50 is thus lifted up by a certain degree. The vehicle 1 and the secondary beach cleaner 50 are stopped when the secondary beach cleaner 50 is on the top edge portions 44*c* of the guiding members 44 of the respective left and right side structure bodies 41R and 41L. Then, the operation of collecting the litter is performed by rotating the mesh body 56. Thereafter, the vehicle 1 and the secondary beach cleaner 50 again operated on the beach to repeat the litter collection operations.

When the operation of collecting the collected litter is performed by rotating the mesh body 56, the litter is directly thrown onto the loading unit 16 of the trailer 13 adjacent to the left of the litter collection station 40. The loading unit 16 can therefore be used as a litter collection container. Accordingly, the collected litter can be carried with the trailer 13 after completion of the cleaning operation, and there is no need to perform the operation of collecting the litter fallen on the ground, which allows reduction in the number of cleaning operation steps.

Figure 6:
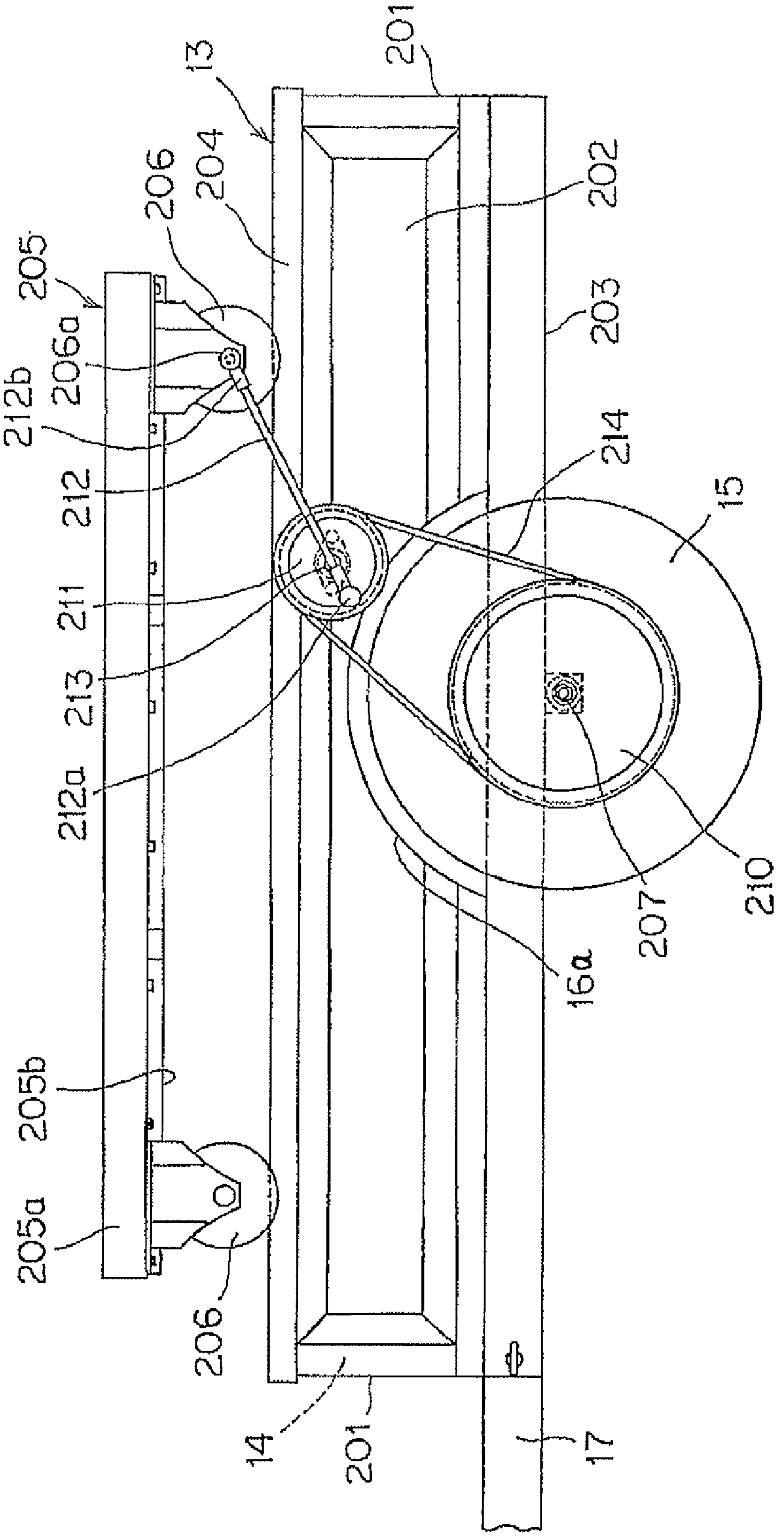
FIG. 6 is a side plan view of a sieve unit is attached to a trailer.
Figure 7:
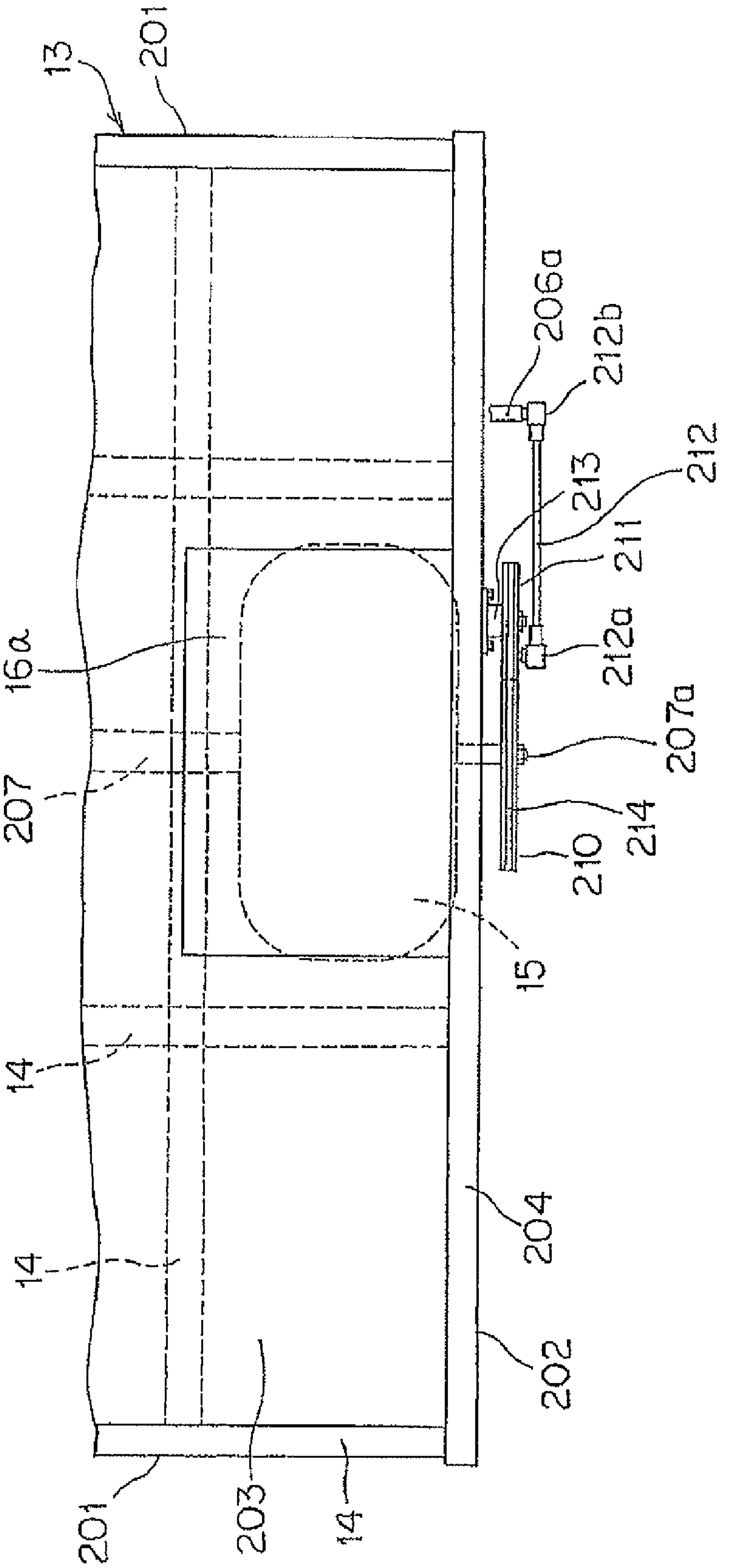
FIG. 7 is a top plan view of a driving mechanism shown in FIG. 6 (the sieve unit is not shown).

FIG. 6 is a side view showing a state in which the sieve unit 205 is attached to the trailer 13. FIG. 7 is a top view of a driving mechanism shown in FIG. 6 (the sieve unit 205 is omitted).

As discussed above, the trailer 13 is shaped as a shallow box. The body frame 14 is shaped substantially square, when viewed in a top view, and the loading unit 16 is provided in such a manner as to substantially overlap with the body frame 14 in a top view. The loading unit 16 is constituted of side wall portions 201 on the respective front and rear of the vehicle body, left and right side wall portions 202, and a bottom wall portion 203. Plate members are fitted onto the body frame 14 to form the side wall portions 201 and 202. The bottom wall portion 203, on the other hand, is placed on the body frame 14, and is detachable from the trailer 13.

In addition, the wheel cavities 16*a* are formed, in an upward cup shape, on the left and right of the bottom wall portion 203 at places corresponding to the left and right wheels 15.

Rail members 204 are attached to the respective top edges (the left and right side edge members 16*b* and 16*c*) of the respective left and right side wall portions 202 of the body frame 14. The rail members 204 are arranged in parallel to each other and extend in the front-rear direction of the vehicle body. The sieve unit 205 is placed on these rail members 204.

The sieve unit 205 is shaped substantially rectangle shape, when viewed in a top view. The sieve unit includes an outer frame portion 205*a* forming the outer frame and a mesh member 205*b* surrounded by the outer frame portion 205*b*. The sieve unit 205 has auxiliary wheels 206 at bottom four corners thereof. The auxiliary wheels 206 engage with the rail members 204 for allowing the sieve unit 205 to move in the front-rear direction through guidance of the rail members 204.

Each of the rail members 204 is formed, for example, by laying a pipe member having a circular section in the front-rear direction of the vehicle body. The traveling face of each of the auxiliary wheels 206 guided by the rail members 204 is formed in such a manner that a middle portion of the diameter of the wheel in the width direction of the vehicle body is constricted to be in contact with an upper semi-circle of the pipe member. Such semi-circle of the pipe member shape restricts the positions of the auxiliary wheels 206 in the width direction of the vehicle body, and allows the auxiliary wheels 206 to move on the rail members 204 in the front-rear direction of the vehicle body.

The left and right wheels 15 of the trailer 13 are connected to each other with an axle 207 extending transversely along the bottom face of the bottom wall portion 203. The wheels 15 rotate when the trailer 13 towed by the vehicle 1 traveling. As shown in FIGS. 6 and 7, a left end portions 207*a* of the axle 207 and the outer frame 205*a* of the sieve unit 205 are connected to each other via a driving mechanism 208 to move the sieve unit 205 frontward and rearward.

As shown in FIG. 6, the driving mechanism 208 includes a drive wheel 210 attached to the axle 207, a driven wheel 211 attached to the trailer 13, and a connecting rod 212 connecting the driven wheel 211 to the sieve unit 205.

The drive wheel 210 is attached to the left end portion of the axle 207, outside of the trailer 13 in a width direction thereof. The drive wheel 210 is arranged coaxially with the axle 207, and rotates in synchronization with rotation of the wheel 15.

The driven wheel 211 is rotatably attached, via a bearing or the like, to a shaft 213 protruding outward of the vehicle, from the left side wall portion 202 of the trailer 13. The driven wheel 211 and the drive wheel 210 are V-belt pulleys around which a V belt 214 is wound. The driven wheel 211 is attached on the same plane as the drive wheel 210 so that the core of the V belt 214 around the drive wheel 210 aligns with the core of the V belt 214 around the driven wheel 211 (see FIG. 6). Accordingly, the driving power of the drive wheel 210 is transmitted to the driven wheel 211 via the V belt 214, rotating the driven wheel 211 along with the drive wheel 210.

The connecting rod 212 is rotatably attached, at its one end 212*a*, to a position de-centered from the rotational center of the driven wheel 211, and at the other end 212*b*, to a rotating shaft 206*a* of the auxiliary wheel 206 positioned at the left rear side of the sieve unit 205. Accordingly, when the driven wheel 211 rotates, the sieve unit 205 is pushed (or pulled) in the longitudinal direction of the connecting rod 212. At this time, the rotation of the end portion connected to the connecting rod 212 allows the sieve unit 205 to move to and fro (back-and-forth) in the front-rear direction of the vehicle body along the rail members 204.

When the wheels 15 rotate by the trailer 13 during towing operation, the sieve unit 205 moves to and fro in the front-rear direction of the vehicle body via the driving mechanism 208.

It may be noted that the bottom wall portion 203 of the trailer 13 is removed when sieving is performed using the sieve unit 205 by moving the sieve unit 205 to and fro. In this manner, sand fallen down through the sieve unit 205 is discharged outside of the trailer 13 through the bottom portion of the trailer 13, thereby sand does not remain inside the trailer 13.

The beach-cleaning trailer according to the embodiment of the present invention is shaped as a box having an open top, and has the wheels 15 at the left and right side wall portions 202. The beach-cleaning trailer 13 is loaded with, and collectively carries, the beach-cleaning equipment 20 and 50 (which are towed by the vehicle 1 to collect litter on the sands) and the litter collection station 40 with which the litter collected by the beach-cleaning equipment 20 and 50 is accumulated.

The beach-cleaning trailer 13 includes a pair of rail members 204 disposed on the upper edges (side edge members 16*b* and 16*c*) of the left and right side wall portions 202 respectively. The rail members 204 face each other with an opening in therebetween. The beach-cleaning trailer also has the sieve unit 205 adapted to move along the rail members 204 and adapted to detachably attach to the rail members 204 by placing the sieve unit 205 on the rail members 204.

Accordingly, sieving can be performed with the sieve unit 205 by placing litter along with sand on the sieve unit 205 using a scoop or the like, and moving the sieve unit 205 to and fro on the rail members 204.

Therefore, the litter and the sand can easily be separated from each other, and only the litter can be collected. Also, even on an area where litter collection is impossible using the beach-cleaning equipment 20 and 50, the litter can be separated and collected mechanically without collecting the litter through manual separation.

Moreover, since the sieve unit 205 is detachable, the beach-cleaning trailer 13 can be used as a trailer having functions of both carrying the beach-cleaning equipment 20 and 50 and the like including the litter collection station 40.

Further, the trailer 13 includes the driving mechanism 208 that transmits rotary power of the wheels 15 to the sieve unit 205 to move the sieve unit 205 to and fro along the rail members 204 in accordance with the rotary power of the wheels. Accordingly, when the wheels 15 rotate, during operation thereof, the sieve unit 205 can move to and fro along the rail members 204. Therefore, the sieving operation of the sieve unit 205 can be performed mechanically, making the litter collection through manual separation unnecessary.

Furthermore, the driving mechanism 208 is a crank mechanism in which the drive wheel provided on the same axis as the axle 207 of the wheels 15 is connected to the sieve unit via the connecting rod 212. Accordingly, the rotary power of the axle 207 can easily be converted to power moving the sieve unit 205 to and fro, allowing the sieving with the sieve unit 205 to be performed with a simple structure.

In addition, the crank mechanism includes the driven wheel 211 around which and the drive wheel 210 the V belt 214 is wound, and the driven wheel 211 is rotatably attached to one end part of the connecting rod 212. Accordingly, the length of the connecting rod 212 and the distance in which the sieve unit 205 moves to and fro can be restricted according to the position to which the driven wheel 211 is attached, improving flexibility of designing the driving mechanism 208.

Furthermore, the bottom wall 203 of the trailer 13 is only placed on the body frame 4. Therefore, the bottom wall 203 can be removed easily. Accordingly, when the sand and litter are sieved with the sieve unit 205, the sand falling down from the sieve unit 205 can fall down through the trailer 13.

The embodiment of the present invention has been described above. However, various modifications and alternations can be made based on the technical concept of the present invention.

For example, although the driving mechanism 208 has the driven wheel 211 around which and the drive wheel 210 the V belt 214 is wound in the present embodiment, the driven wheel 211 does not have to be provided. The sieve unit 205 can move to and fro in the front-rear direction by, for example, rotatably attaching the one end part 212*a* of the connecting rod 212 to a position de-centered from the center of the axle 207 of the drive wheel 210. Thus, by performing the sieving through the to-and-fro movement of the sieve unit 205 on the rail members 204, the sand and litter can easily be separated from each other, and only the litter can be collected.

Moreover, power transmission is performed between the drive wheel 210 and the driven wheel 211 by using the V belt 214, but it is not limited to this. A suitable mechanism can be employed as long as it can transmit rotary power from the drive wheel 210 to the driven wheel 211. For example, such mechanism includes a transmission mechanism using a chain and a sprocket, a transmission mechanism using a spur gear, and the like.

Further, although provided to a position on the left of the trailer 13, the driving mechanism 208 may also be provided on the right or to both sides of the trailer 13. Also in this case, by performing the sieving through the to-and-fro movement of the sieve unit 205 on the rail members 204, the sand and litter can easily be separated from each other, and only the litter can be collected.

Further, an alternative structure may be employed by transmitting the rotation driving power of the wheels 15 by 90° with a bevel gear or the like to move the sieve unit 205 to and fro in the width direction of the vehicle body.

Figure 8:
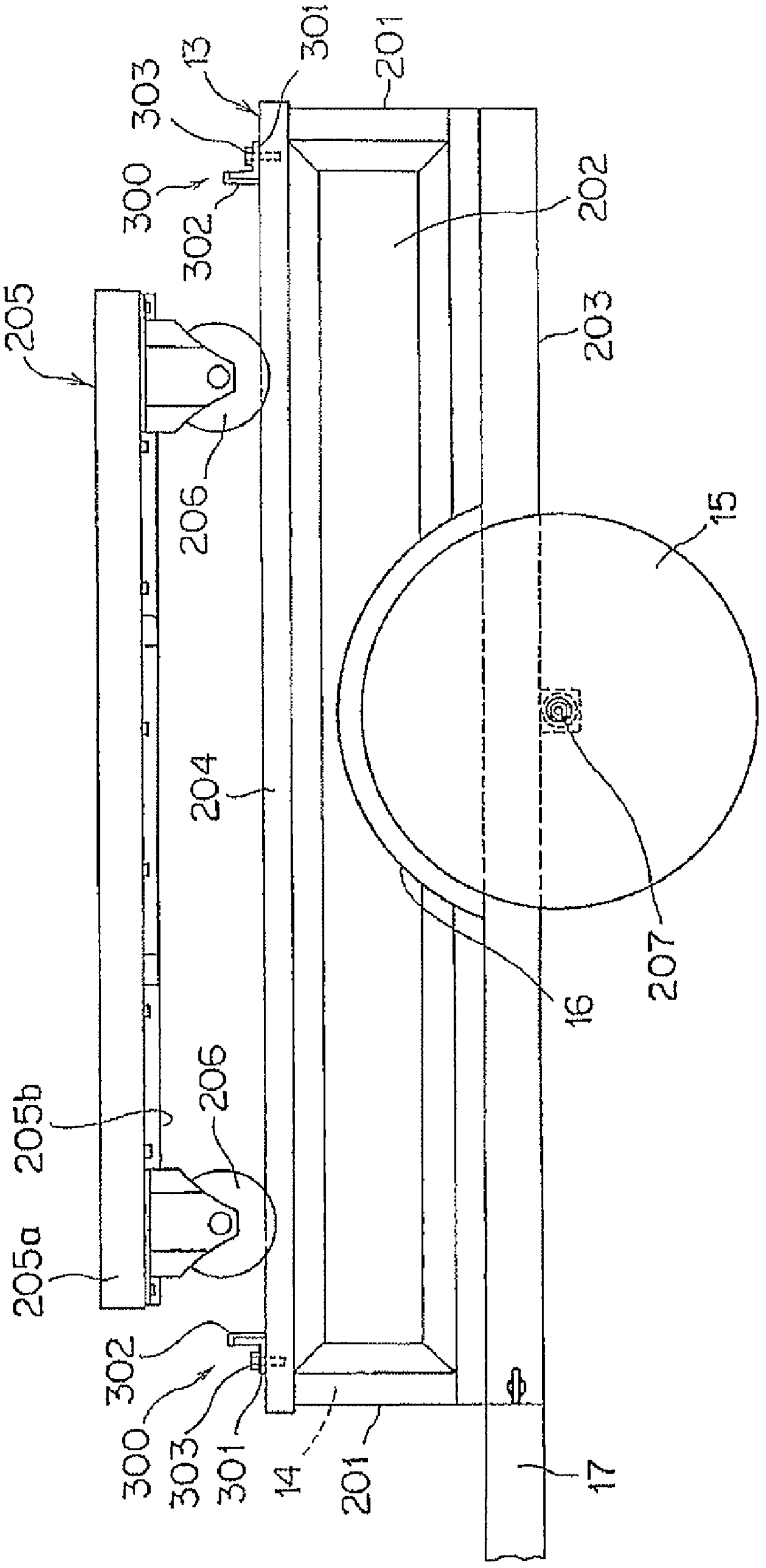
FIG. 8 is a side plan view of a trailer provided with no driving mechanism, according to a modified embodiment of the present invention.

As shown in FIG. 8, the sieving with the sieve unit 205 may be performed manually without providing the driving mechanism 208 to the trailer 13.

In such a case, stoppers 300 are provided to both ends of the rail member 204 in the front-rear direction of the vehicle body. The stoppers 300 restrict the movement range of the sieve unit 205. As shown in FIG. 8, each stopper 300 is formed by covering an L-shaped support member 301 with an elastic body 302. The stopper 300 is placed so that the elastic body 302 may face the sieve unit 205, and is detachably fixed to the rail part 204 with a bolt 303.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A beach-cleaning trailer apparatus, comprising:

a box-shaped trailer having side walls, and having an opening on a top portion thereof, and including a plurality of trailer wheels arranged at lower portions of the side walls; said trailer being operable to be loaded with, and collectively carry a beach cleaner and a litter collection station, said beach cleaner configured to be towed by a vehicle for collecting litter on a beach, wherein the litter collected by the beach cleaner is accumulated in the litter collection station;

said box-shaped trailer comprising:

a pair of rail members disposed on upper edges of respective opposite said side walls such that said rail members face each other with said opening therebetween; and a sieve unit detachably attached to said rail members, said sieve unit comprising a first side having two spaced apart sieve wheels which ride on a first one of said rail members, and a second side having two spaced apart sieve wheels which ride on a second one of said rail members, wherein each of said sieve wheels includes a middle portion in a width direction thereof which has a first radial diameter and is arranged so as to contact an upper portion of a corresponding rail member, and a side portion attached to and extending radially outwardly relative to the middle portion for contacting a side surface of the corresponding rail member;

wherein said sieve unit is operable to move reciprocally along said rail members.

2. The beach-cleaning trailer apparatus according to claim 1, further comprising a driving mechanism for transmitting rotary power of the trailer wheels to the sieve unit for moving the sieve unit to and fro along the rail members based on the rotary power of the trailer wheels.

3. The beach-cleaning trailer apparatus according to claim 2, wherein the driving mechanism is a crank mechanism, said crank mechanism comprising:

a drive wheel arranged on an axle of the trailer wheels;

a driven wheel driven in accordance with rotation of said drive wheel, said driven wheel being operatively connected with said drive wheel; and a connecting rod for operatively connecting said sieve unit with said driven wheel.

4. The beach-cleaning trailer apparatus according to claim 3, wherein one end of said connecting rod is connected to said driven wheel at a de-centered position thereof.

5. The beach-cleaning trailer apparatus according to claim 3, wherein each of said drive wheel and said driven wheel comprises a V-pulley; and wherein said drive wheel is operatively connected with said driven wheel using a V-belt.

6. The beach-cleaning trailer apparatus according to claim 1, further comprising two pairs of spaced-apart stoppers, wherein a respective one of said stoppers is detachably arranged at a corresponding end portion of each of said pair of rail members; wherein said stoppers cooperate to restrict horizontal movement of said sieve unit.

7. The beach-cleaning trailer apparatus according to claim 6, wherein each of said stoppers comprises an L-shaped support member having an elastic body mounted thereon, said L-shaped support member positioned such that a vertically extending portion thereof extends substantially vertically above said rail, and said elastic body is attached to said vertically extending portion and faces the sieve unit.

8. The beach-cleaning trailer apparatus according to claim 1, wherein said beach cleaner is operable to collect litter of various sizes along with sand on a beach; and wherein said sieve unit is operable to separate litter of various sizes from sand.

9. A system for separating litter from sand, said system comprising:

a plurality of beach-cleaning equipment; said beach-cleaning equipment being operable to collect litter of various sizes and sand when moved on a beach;

a collection station for collecting litter and sand collected by said beach-cleaning equipment;

a box-shaped trailer having an opening at a top portion thereof, and a plurality of trailer wheels arranged at a lower portion of sidewalls thereof; said trailer configured to be loaded with, and collectively carry said litter collection station and said plurality of beach-cleaning equipment;

a pair of rail members disposed on upper edges of respective opposite said side walls of said trailer such that said pair of rail members face each other with the opening therebetween; and a sieve unit operatively and detachably mounted on said rail members, said sieve unit comprising a first side having two spaced apart sieve wheels which ride on a first one of said rail members, and a second side having two spaced apart sieve wheels which ride on a second one of said rail members, wherein each of said sieve wheels includes a middle portion in a width direction thereof which has a first radial diameter and is arranged so as to contact an upper portion of a corresponding rail member, and a side portion attached to and extending radially outwardly relative to the middle portion for contacting a side surface of the corresponding rail member;

wherein said sieve unit is operable to reciprocally move along said rail members in a back-and-forth direction.

10. A system for separating litter from sand according to claim 9, further comprising a driving mechanism for transmitting rotary power of the trailer wheels to the sieve unit for moving the sieve unit in said back-and-forth direction along the rail members based on the rotary power of the trailer wheels.

11. A system for separating litter from sand according to claim 10, wherein the driving mechanism comprises:

a drive wheel arranged on an axle of the trailer wheels;

a driven wheel driven operatively connected with said drive wheel; and a connecting rod operatively connecting said sieve unit with said driven wheel.

12. A system for separating litter from sand according to claim 11, wherein one end of said connecting rod is connected to said driven wheel at a de-centered position thereof.

13. A system for separating litter from sand according to claim 11, wherein each of said drive wheel and said driven wheel comprises a V-pulley; and wherein said drive wheel and said driven wheel is operatively connected with each other using a V-belt.

14. A system for separating litter from sand according to claim 9, further comprising two pairs of spaced-apart stoppers, wherein a respective one of said stoppers is detachably arranged at a corresponding end portion of each of said pair of rail members; wherein said stoppers cooperate to restrict horizontal movement of said sieve unit.

15. A system for separating litter from sand according to claim 14, wherein each of said stoppers comprises an L-shaped support member having an elastic body mounted thereon, said L-shaped support member positioned such that a vertically extending portion thereof extends substantially vertically above said rail, and said elastic body is attached to said vertically extending portion and faces the sieve unit.

16. A system for separating litter from sand according to claim 9, wherein said plurality of beach-cleaning equipment includes a primary beach cleaner for raking sand and litter, and a secondary beach cleaner having churn up members for raking sand and relatively small size litter that is missed by said primary beach cleaner; and wherein said sieve unit is operable to separate litter from sand collected by said primary beach cleaner and said secondary beach cleaner.

17. A sand-sifting trailer apparatus comprising a pair of trailer wheels;

a detachable bottom wall;

a pair of sidewalls;

a pair of rail members, each of said rail members attached to an upper edge of respective one of said side walls such that said pair of rail members face each other with an opening therebetween;

a sieve unit operatively and detachably mounted on said rail members, said sieve unit comprising a first side having two spaced apart sieve wheels which ride on a first one of said rail members, and a second side having two spaced apart sieve wheels which ride on a second one of said rail members, wherein each of said sieve wheels includes a middle portion in a width direction thereof which has a first radial diameter and is arranged so as to contact an upper portion of a corresponding rail member, and a side portion attached to and extending radially outwardly relative to the middle portion for contacting a side surface of the corresponding rail member; and a driving mechanism for transmitting rotary power of the trailer wheels to the sieve unit for reciprocally moving the sieve unit in a back-and-forth direction along the rail members.

18. A trailer apparatus according to claim 17, wherein said driving mechanism comprises:

a drive wheel arranged on an axle of the trailer wheels;

a driven wheel arranged on one of said sidewalls, and operatively connected with said drive wheel; and a connecting rod operatively connecting said sieve unit with said driven wheel.

19. The trailer apparatus according to claim 18, wherein one end of said connecting rod is connected to said driven wheel at a de-centered position thereof.

20. The trailer apparatus according to claim 18, wherein each of said drive wheel and said driven wheel comprises a V-pulley; and wherein said drive wheel is operatively connected with said driven wheel using a V-belt.

* * * * *